Aug. 29, 1939.  C. B. GRADY  2,170,993
AIR CONDITIONING
Filed June 10, 1938  2 Sheets-Sheet 1
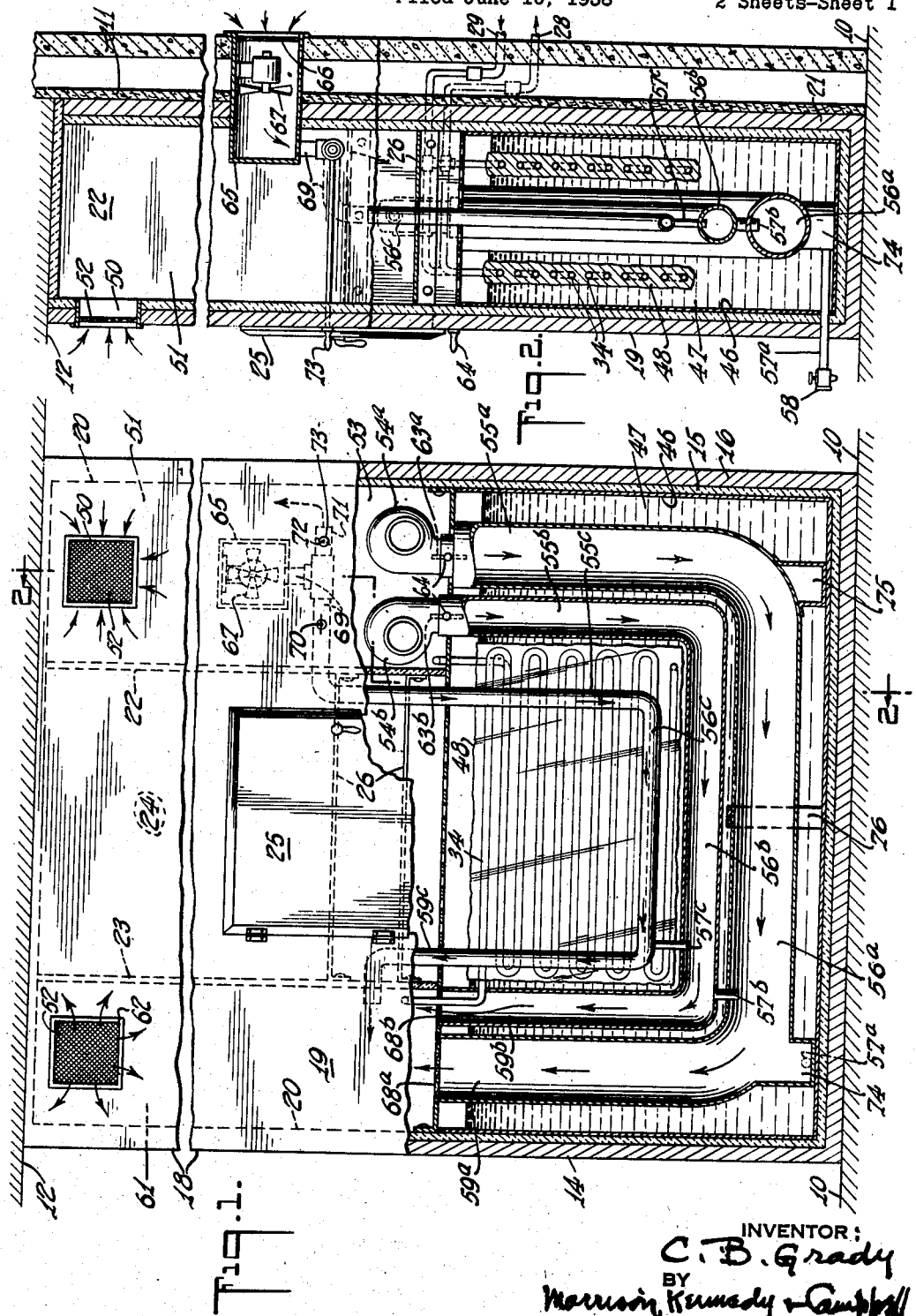
INVENTOR:
C. B. Grady
BY
Morrison, Kennedy & Campbell
ATTORNEYS.

Aug. 29, 1939.   C. B. GRADY   2,170,993
AIR CONDITIONING
Filed June 10, 1938   2 Sheets-Sheet 2
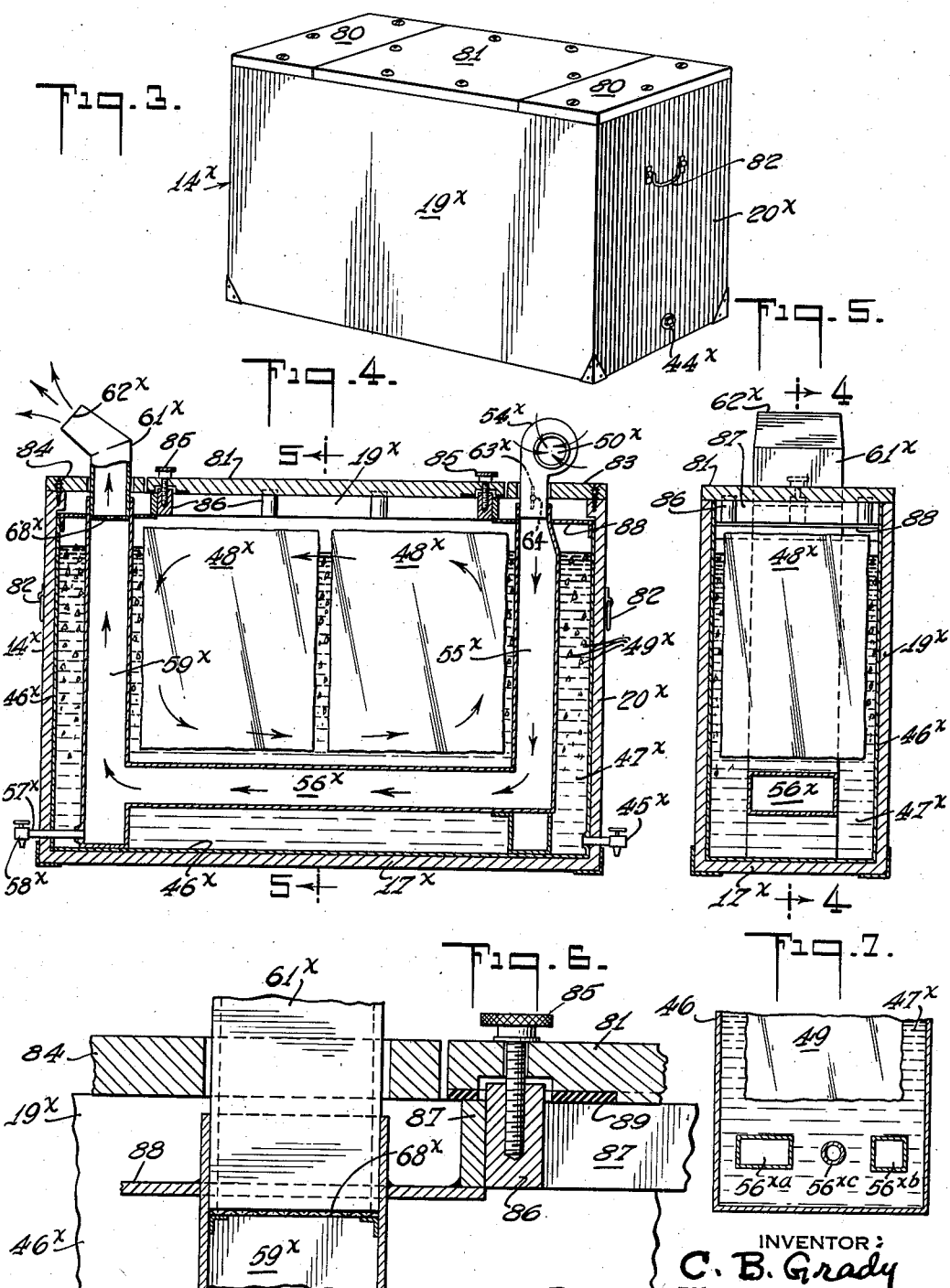
INVENTOR:
C. B. Grady
BY
Morrison, Kennedy & Campbell
ATTORNEYS.

Patented Aug. 29, 1939.

2,170,993

UNITED STATES PATENT OFFICE 2,170,993

AIR CONDITIONING

Charles B. Grady, Sky Top, Pa.

Application June 10, 1938, Serial No. 212,880

14 Claims. (Cl. 62—140)

This invention relates to air conditioning, having reference to the treatment of the air in an enclosure of any sort intended for human occupancy or other uses; and the invention includes the novel features of apparatus as hereinafter disclosed and as well certain methods of air conditioning to be explained in connection with such apparatus. The invention has wide utility and is shown herein in a stationary or permanent form, for use in dwelling or sleeping rooms, offices, or the like, also in a more compact and portable form, which may be set up as desired in an automobile, trailer, stateroom, train, yacht, ship or other vehicle or even transported from place to place according to needs. In either case the invention may be useful for purposes of manufacturing or chemical processing or the like.

Typical examples of air conditioning for such general purposes are illustrated in my copending applications Serial No. 49,869, filed November 15, 1935 and No. 103,420, filed September 30, 1936, with which applications the present invention has certain features in common, and which may be referred to for details of disclosure not included herein.

The general object of the present invention is to afford an efficient means and method for conditioning air, namely for use in various kinds of enclosures for human occupancy, etc.; the term conditioning being intended to include various treatments, principally by way of controlling the temperature and humidity of the air, but also refreshing it methodically to maintain proper oxygen content, filtering to clean it, and the like. Temperature treatment includes cooling of the air in the summer season or warming it in the winter season, and control of humidity involves usually dehumidifying in the summer season and humidifying in the winter season, these two sorts of control being conducted jointly or cooperatively by this invention.

Further objects include the providing of conditioning apparatus which is practical and economical in construction and use, convenient in operation and regulation, and adapted to be constructed in compact form for portable purposes.

A further object consists in the provision of a simple and practical methodd of air conditioning, capable of full control, according to the needs, and involving the recirculation of the enclosure or room air through passages in which the treatments are performed, and in such passages performing and regulating the temperature and humidity controlling operations in a methodical manner so as to obtain and maintain comfort conditions in the room, or in other words maintain the atmosphere, as to its temperature and humidity, within a desired comfort zone, which may be determinable by the wet and dry bulb temperature conditions in the room air. It may be preliminarily stated that the cooperative regulation of temperature and humidity is performed, according to this invention, by controlling the mass, volume or velocity of air under treatment flowing through the treating passage or passages from the enclosure and back to the enclosure. Particularly, an advantageous control is herein afforded by providing a plurality of different passages or paths of recirculation, with means for forcing the recirculation separately through them, preferably in parallel, and differentially controlling the relative velocities therein and thereby the treatment of the respective streams of air. By regulating these actions according to the wet and dry bulb conditions existing in the room such conditions may be reliably maintained approximately within the desired comfort zone, as will be more fully explained. In conjunction with these controls there may be a progressive refreshment of the enclosed air by injection of outside air under variable control, operable for example inversely according to the carbon dioxide or other content of the enclosure air. The term "humidity" will be herein used as meaning absolute rather than relative humidity, that is, the number of grains of moisture per pound of air; unless specifically otherwise stated. The difference is important since a reduction of the absolute humidity of the enclosure or room air may or may not result in a reduction of the relative humidity thereof, as will be further explained.

Other and further objects and advantages of the invention will be explained in the hereinafter following description of an illustrative embodiment thereof or will be apparent to those conversant with the subject. To the attainment of such objects and advantages the present invention consists in the novel air conditioning apparatus and method and the novel features of combination, arrangement, construction and operation herein described or illustrated.

The method hereof, in its several aspects, may be carried out by means of the apparatus disclosed or other apparatuses adapted thereto. The apparatus will first be described and thereafter the method.

In the accompanying drawings

Fig. 1 is a front elevation view of an air conditioning apparatus embodying the present invention, with the lower part of the apparatus shown in central vertical section and the upper part broken away for vertical condensation of the figure.

Fig. 2, looking at the right side of Fig. 1, is a vertical section taken on the crooked section line 2—2 of Fig. 1.

The apparatus shown in Figs. 1 and 2 is of a kind and form adapted especially for stationary or indoor use, whereas the embodiment shown in Figs. 3 to 7 is adapted especially for portable use, whether in a stationary location or room or on the other hand on a moving vehicle, as a train, automobile, trailer or ship. The first form however could be built into a compartment of a vehicle.

Fig. 3 is a perspective view of a modification consisting of a portable apparatus shown in its closed and sealed condition, ready for shipment.

Fig. 4, in front view, is a vertical section of the same apparatus as set up for use, taken on the section line 4—4 of Fig. 5.

Fig. 5 is a vertical section view taken on the line 5—5 of Fig. 4.

Fig. 6, on a larger scale, is a section view of a portion of Fig. 4 showing certain details of structure.

Fig. 7 is a vertical sectional view similar to Fig. 5, showing a modification thereof.

The first construction, that of Figs. 1 and 2, is shown with a refrigerating coil 34 for mechanical refrigeration purposes. However, by omitting the coil, it is adapted also to the use of manufactured or preformed ice to be delivered or introduced into the tank. The second form, shown in Figs. 3 to 6, employs preformed ice, in cake and broken form, although the cooling effect could be produced by means of a refrigerating coil. In either case, where convenient, a combination of the two systems may be employed. In cases where the user can not afford the expense of complete equipment including refrigerating mechanism and coil, as in a small shop or office, then the lower cost of the apparatus using preformed ice is of advantage, the user to furnish or perform the labor for servicing the apparatus, for example twice a day in very hot humid weather. The portable type of unit has the great advantage that in an emergency it may on short notice be placed in a sick room and started promptly into operation. When an apparatus using preformed ice is installed for the sake of low first cost it may subsequently be supplemented by adding the refrigerating system and freezing coil.

In either form or embodiment the apparatus hereof may be located either inside the enclosure to be conditioned, or adjacently outside with communicating ducts. Where mechanical refrigeration is employed several conditioning apparatuses may be served by a single refrigeration unit. In all cases fresh outside air may be progressively forced into the enclosure, through a filter, and, with this invention, may be otherwise conditioned during its passage into the enclosure.

Referring first to the embodiment of Figs. 1 and 2 the invention is here shown as built into a room or other location. The room is indicated by its floor 10, hollow wall 11 and ceiling 12. Between the floor and ceiling and adjacent to the wall is shown a tall cabinet 14 which in its lower part contains the water tank or compartment 46 to be later described. The cabinet preferably contains an insulating layer 15 and an external covering or housing 16 which may be of finished wood or other ornamental material. Above the tank the housing constitutes an extension 18. The housing and extension are formed with a front wall 19 and end walls 20, with a back wall 21, if desired, adjacent to the room wall 11.

In the upper housing portion or extension 18 are indicated two interior vertical walls or partitions 22 and 23. The partition 22 is near the right end wall and therewith encloses an ample air downtake or passage 51, while at the left the partition 23 similarly encloses with the adjacent end wall a wide air uptake 61, as will be further described. Between the partitions 22 and 23 is accommodated a general space or compartment 24 which may be used for miscellaneous purposes, storing commodities to be protected from the heat etc. This accommodation space 24 is adapted to access by a removable or swingable door 25, and within are shown convenient shelves 26. A small fan in space 24 may maintain air circulation to distribute the cooling effect, or a part of the refrigeration coil 34 to be described may be extended up into this storage compartment.

The water tank 46 of the apparatus is shown as of a relatively great depth compared with the apparatus of the prior applications referred to, and as containing a deep body of heat transmitting liquid or water 47, reference to water being intended to include any other suitable liquid. Within the tank and water is immersed the refrigerating coil 34; which, for winter may be used as a steam coil or replaced by an electric heating coil, in which case water should be supplied to the recirculating air to humidify it. The coil 34 may be multiple and is shown as having two sections in parallel.

As in the prior applications the coil 34 may be supplied with refrigerant by a pipe 29 from a suitable source, the refrigerant returning by pipe 28 to the source. As indicated the apparatus may be operated with such a degree of refrigerating effect that a part of the water 47 in which the coil is immersed is congealed into the form of ice 48 carried upon the immersed coil, and affording a reservoir of potential cold by which the latent cold of freezing is utilized as in said application No. 103,420 described.

The air recirculation ports or passages in Figs. 1 and 2 may be as follows. The cabinet extension 18 is shown formed with air ports 50 and 62, preferably in its front wall 19, the first constituting a port leading out from the room or enclosure and into the interior air downtake 51 of the apparatus, already mentioned, the other port delivering out from an interior uptake 61 back into the room by port 62, as will be further described. In each of said air ports may be provided a grill or mesh 52, shutting off a view of the interior and if desired provided with a filter or other treating device.

The enclosure air, thus entering the apparatus by port 50 flows down through the wide downtake passage 61, the lower part of which may be considered as a chamber 53 containing certain air propelling means, as blowers or fans. Thus a first fan 54a is shown, which may be of the centrifugal type, drawing air centrally from the chamber and propelling it downwardly through the downtake portion 55a of a first submerged air duct 56a, the main or general portion of which extends laterally through the lower part of the water tank and leads into a connecting uptake portion 59a which in turn delivers into the larger air uptake 61 above the tank through which the air flows to and through the port 62 back into the enclosure or room.

It is characteristic of this invention that the described air duct 56ª including not only its general or horizontal portion but its two legs, the downtake 55ª and the uptake 59ª, are all submerged in the water or transmitting liquid of the tank 46. This part of the apparatus may be described as a submerged air duct, of substantial size, and preferably without substantial baffling or obstruction, which as a whole is of U-shape, meaning that it has the submerged downtake of substantial height and the corresponding submerged uptake and with an extended length of duct connecting the two. The three duct portions need not be straight, but the lower portion is preferably effectively horizontal, and smooth bends connect it with the leg portions. In cross-section the passages are preferably wide in all directions, as round or polygonal as shown in Fig. 2, 5 and 7.

Within the fan chamber 53 is shown a second air fan or centrifugal blower 54ᵇ, similarly delivering downwardly through the downtake portion 55ᵇ of a submerged air duct 56ᵇ which has also a submerged uptake 59ᵇ delivering into the larger uptake 61 and thence back into the room.

Each of the fans or blowers 54ª or 54ᵇ is preferably motor driven, by a regulable motor through which the force of air propulsion may be varied, thus to adjust the flow or velocity through each of the submerged ducts, which are preferably subject to independent regulation, or even selective use, either one or the other, or both of the fans and ducts being adapted to be put into or out of active operation at will or in accordance with the desired control. Each blower may be of a kind having regulation by speed variation, by throttle, or by vortex control. Additional control of the air flow or velocity through the respective ducts may be afforded by dampers 63ª and 63ᵇ respectively, conveniently located beyond or below the corresponding fans, for example at the neck whereat each fan delivers into the submerged duct. Each submerged duct may be provided with an air filtering device or screen, and in Fig. 1 are shown filters 68ª and 68ᵇ, where the uptakes 59ª and 59ᵇ deliver into the larger uptake 61.

With this invention preferably a third submerged air duct 56ᶜ is employed, bringing in fresh air in regulated quantities for supply to the room, or enclosure; useful for refreshment of the composition of the air in case of excess $CO_2$ content or other pollution, as by smoke or fumes. The three submerged ducts are shown all of different sizes, the first duct 56ª being the largest, the duct 56ᵇ being of next size, and the duct 56ᶜ being relatively much smaller for the purpose of progressive refreshment of the recirculated air. The fresh air may be brought into the apparatus by an intake chamber 65, the outer portion of which is shown extending through the room wall 11 to an outdoor point, where it is provided with a filter 66. Within the intake chamber is shown a fan 67 which may either be regulable in speed or subject to being put into or out of operation as may be advisable. From the chamber 65 leads a pipe 69 which extends to the top of the downtake leg 55ᶜ of the small duct 56ᶜ, the uptake leg 59ᶜ of which is shown delivering into the large air uptake 61 which leads back to the room. Regulation of fresh air injection may be by means of a damper 70 in the pipe 69. This may be shut when outside air is comfortable and recirculation is stopped. In that case a bypass or escape 71 is provided having a damper 72 for direct delivery into air passage 51, which then becomes an uptake, delivering to the room. The dampers 70 and 72 may be worked by handles 73.

The described system of submerged air ducts may be provided with a system of drainage for the removal of condensate, which tends to accumulate by the cooling and dehumidifying of the treated air. Thus the lower left portion of the duct 56ª is shown formed with a depending pocket 74, which may also serve as a leg or support for the duct, there being a similar dummy support 75 at the other end. From the pocket 74 extends a drain pipe 57ª which discharges by way of a drip cock 58. For convenience the second air duct 56ᵇ may be caused to drain its condensate by drain pipe 57ᵇ directly into the first or larger duct, and thence to the same outlet and drain cock. A similar drain pipe 57ᶜ is shown draining from the third duct 56ᶜ into the second duct. The several ducts may receive support from each other in the same manner as the first duct is supported upon the tank bottom, and a further or center support 76 for duct 56ª is shown. The progressive or methodical removal of condensate is an important factor in the summer use of an air conditioning plant such as that described.

As an example of submerged air ducts with circulation control, the ducts 56ª, 56ᵇ and 56ᶜ may be of the sectional area of circles of diameters of 7 and 4 and 3 inches respectively, with air drive to afford variable velocities for example in the neighborhood of 300 and 1500 feet per minute for 56ª and 56ᵇ respectively, that in 56ᶜ being much slower. In duct 56ª the control by fan 54ª or damper 63ª may be manually or automatically effected according to humidity in the room atmosphere, e. g. as determined by wet and dry bulb temperatures. In duct 56ᵇ the similar control may be according to ordinary or dry bulb temperature. A humidostat or wet bulb controller and a thermostat respectively may effect these controls. The control in duct 56ᶜ may be according to the need of refreshment of oxygen, as by a $CO_2$ meter. In all cases there may be master control by time mechanism. The refrigerating action in the first form may be controlled to keep pace with the extraction of heat from the room air and preferably to form and maintain an ice layer on the coils. So also the drainage of condensate may be automatic or manual to prevent excess accumulation.

Referring next to the modification shown in Figs. 3 to 6, this contains certain of the general features of the first form of construction. A trunk or small cabinet 14ˣ is adapted to be tightly closed or sealed as against the loss of water, in either its shipping condition as shown in Fig. 3, or in its operating condition as shown in Figs. 4, 5 and 6; in which latter condition it is shown as standing upright on the floor but can if desired be turned over upon its end or side without impairing the action. When sealed for shipping as in Fig. 3 the apparatus is preferably empty of water, and certain parts are removed for packing inside the trunk for shipping purposes, as will be described. Various practical uses of this small portable apparatus have been indicated; for example when used for air-conditioning an automobile the trunk may safely be installed and operated in a convenient middle location within the body of the car.

Referring to details, the trunk 14ˣ is shown as formed by a bottom 17ˣ, side walls 19ˣ and end walls 20ˣ, these enclosing within them the metal lining 46ˣ constituting the water tank. The exterior walls may be composed for example of wood, such as plywood, and ornamentally covered as with leather.

The water tank 46ˣ may be provided with a drain nipple and cock 45ˣ for draining out the contained water 47ˣ, and when this drain is removed it may be replaced by a plug 44ˣ as seen in Fig. 3, for shipping purposes, and the same with drain 57ˣ to be described. As a refrigerating means, instead of a coil, there is shown preformed or manufactured ice 48ˣ in the form of large cakes inserted from above when the tank is opened for the purpose, and any amount of small or cracked ice 49ˣ may also be supplied. The larger the initial amount of ice the smaller will be the initial amount of water, which is desirable, the ice gradually melting and tending to float in its own water. The ice may initially occupy as much as 80% of the total volume of the tank. As with the refrigerating coil 34 of the first form, the cake ice 49ˣ in this second form is shown accommodated within the contour of the U-shape air duct 56ˣ, so that highly efficient cooling action may be transmitted through the water 47ˣ and the walls of the submerged duct to the air flowing through the contained passage.

Referring next to the air flow, the port 50ˣ leading from the room atmosphere into the apparatus may be the inlet of the driven fan 54ˣ. An electric motor is to be understood, with a connection by which it may be plugged into any ordinary outlet, and as in the first form the motor may be regulable as to time and speed of operation, and the fan or blower may be of regulable type.

The recirculation of room air from and back to the room may thus be into the port 50ˣ as stated, and thence driven by the fan 54ˣ downwardly through the air downtake 55ˣ which, according to this invention, is of substantial height and submerged to a substantial depth within the tank water. The down-take passage 55ˣ may be considered as a portion of the U-shape duct 56ˣ, through the lower part of which the air flows laterally from the downtake portion to and through an uptake portion 59ˣ, thus completing the U-shape of the duct. To remove condensate there is shown a drain pipe 57ˣ leading from a pocket of the air duct and delivering externally by a cock 58ˣ.

After traversing the submerged air duct the air may be delivered directly into the room, but preferably first traverses an extension uptake or pipe 61ˣ having a bent shape so that it may be turned in different directions, serving as a deflector to direct the air stream, the air finally issuing from the extension 61ˣ through a port 62ˣ into the room. For further control of air flow a damper 63ˣ may be introduced in the air passage, for example between the fan 54ˣ and the downtake 55ˣ, and operated by a handle 64. Also, a filter may be included, for example the filter 68ˣ located either in the removable extension 61ˣ or directly in the uptake 59ˣ, as shown in Figs. 4 and 6 respectively. These or other filters may include means to absorb or neutralize fumes or other atmospheric poisons.

When the trunk is closed as in Fig. 3 its top is sealed by a pair of end covers 80 and a central cover or plate 81, all screwed in place. In this condition the removed parts 45ˣ, 54ˣ, 57ˣ, 61ˣ and the like may be placed within the empty trunk for convenience. Handles 82 are applied to the trunk for convenience of handling.

When put in operative condition the end plates 80 are removed and are replaced with a right end cover 83 and a left end cover 84, apertured respectively to receive the fan outlet and the extension uptake. In this condition the central cover plate 81 may be held in place by thumb screws 85 which are readily removable to enable the lifting of the cover and the inserting of cake ice. The details of construction may be as shown in Fig. 6 on an enlarged scale. The thumb screws 85 are received in a series of lugs 86 which are welded or otherwise fixed upon a frame piece or band 87 extending along near the tank sides or around near the periphery. Between the frame band 87 and the tank walls are shown sunken covers 88, apertured to receive the downtake 55ˣ and uptake 59ˣ respectively, these being welded or water tightly united together. When the cover plate 81 is applied and bolted down it may be rendered water tight by a gasket 89 resting on the spaced frame strip or band 87. Thus the tank is wholly sealed against water escape while the submerged duct affords free air recirculation.

Referring again to the embodiment of Figs. 1 and 2, and to tests made by applicant thereof, it was found that, under the conditions of such tests, a cool but not too cold temperature of water bath surrounding the large duct 56ᵃ was best for dehumidification. For instance it was determined that there is a greater difference between the resulting dry and wet bulb temperatures with an average water bath temperature of about 45° F. than about 35° F.

Fig. 7 shows a modification of Figs. 4 to 6 wherein instead of the single duct 56ˣ there is shown a plurality of submerged ducts 56ˣᵃ, 56ˣᵇ and 56ˣᶜ corresponding generally with the ducts 56ᵃ, 56ᵇ and 56ᶜ in Figs. 1 and 2, but of different relative arrangement. Each of the ducts in Fig. 7 is to be assumed to have its circulating fan and regulation of action as already described.

In the several embodiments disclosed the submerged air duct or ducts substantially surround or enclose the refrigerating means, such as the ice cakes shown in Fig. 4. On this figure are applied a series of arrows showing the manner of flow of water within the tank, being generally upward in the neighborhood of the downtake 55ˣ and downward adjacent to the cooler uptake 59ˣ and transversely connecting these two flows.

If apparatus as shown in Figs. 4–7 is used in a stationary location or room, rather than a movable vehicle, the cover 81 may be left off and the ice cakes 48ˣ may be allowed to project well above the top of the tank and may be covered with some light insulating cover (not shown on drawings) and the melting water drained off by drain 45ˣ and flowed away by pipe to a sewer. Said cock 45ˣ may be used to remove excess depth of water, as under ordinary float-valve control; or an overflow pipe could be added for this purpose, extending through the tank wall at the desired level, and connecting externally, as by a rubber tube connection, to the same pipe that connects drain 45ˣ to the sewer. The drain pipes may be exposed to the air in the room and thus aid in the cooling of the room air.

After the said ice cakes have partially melted, inspection shows deep grooves cut by water erosion in said cakes near the upper surface of the water in the tank, thus establishing that a definite circulation occurs horizontally at surface of the water. This action also applies to the apparatus shown in Figs. 1 and 2 when the coil 34 is removed and the upper portion of apparatus is modified to accommodate extended ice cakes.

In some particular cases, as where spring water is available, of sufficiently low temperature, the use of ice may be dispensed with and the tank fed progressively with such cold water.

The submerged air ducts in the various embodiments may be of round or square cross section or modifications thereof as elliptical or oblong, presenting a fairly free cross sectional area for the flow of air, and smooth flow may be promoted by rounding the corners at the turns as seen in Fig. 1 and by omitting baffling or other agitating devices. When several submerged ducts are employed they may be variously related to each other, for example superimposed, or in lateral alinement, or staggered, and either spaced apart or in close proximity to each other. Instead of a plurality of ducts, with a fan for each, a single duct may have two entrances, with a fan for each entrance, independently regulable. Instead of placing all of the ducts within a single tank, they may be placed within two or more separate tanks, or separate compartments of a tank, with various arrangements as to size of duct and velocity of flow therein.

Method of air conditioning

To describe the preferred method of this invention, conditions of summer discomfort will be assumed, understanding that operations in winter may be in general the reverse. The treatment or cooling of the air is done during recirculation thereof from and back to the room through a passage or passages, the apparatus taking any desired form, and suitable filters being understood for progressively cleaning the air. The purpose of the method is to establish in the room, particularly for human habitation, conditions of comfort, as desired by maintaining in said room dry and wet bulb temperatures sufficiently below the dry and wet bulb temperatures of the outside air for such purposes; an auxiliary object being to maintain a suitable composition of air as against excess $CO_2$ or other pollution.

The described controls will first be reviewed, and periods of active operation only need be considered. It will be assumed that adequate temperature changing or refrigerating action is provided to maintain cool the passage walls, and methodical removal of condensate is also assumed.

The controls may first be considered in the broad aspect in which there may be either a single recirculation passage or more than one. Within the cooled or submerged passage (or passages) the control actions are varied according to the conditions to be corrected; and as already stated the operation or control may be either manual, under observation of instruments or effects, or automatic through responsive devices or mechanism. The control consists generally in varing properly the recirculation flow, that is, the velocity of the air traversing the passage, determining the volume or mass of air recirculated per unit of time. As already stated such circulation control may be through adjustment of the fan, or of the drive of the fan, or by a damper in the passage.

The flow rate and velocity are to be increased to secure greater action, such as more extensive cooling of the air, with decrease of velocity when less action is desirable. As examples, when the temperature (dry bulb) is too high the velocity may be increased to give greater cooling action. When the humidity becomes too high, as measured either by a predetermined wet bulb temperature or by the wet bulb in relation to the dry bulb temperature, the velocity and action, according to this invention, will also be varied. Thus when either of these factors rises above a predetermined point, removing the conditions out of a desired comfort zone, a correcting action is performed, and indeed both corrections may be performed cooperatively and simultaneously. The results are manifested by the consequent drop of the dry bulb temperature and the reduction of absolute humidity, the action decreasing as these approach such relations as to come within the desired comfort zone.

The desired comfort zone referred to may be any one of the several zones mapped out on standard psychrometric charts, or it may be a zone particularly well adapted for human occupancy of a room, or for a manufacturing or chemical or other process being carried on in said room.

In the specific aspect that the invention embodies two separate passages, as in Figs. 1 and 2, these may be separately but cooperatively controlled in respect to the factors of temperature and humidity. Thus the circulation in the first of the cooled or submerged passages may operate to lower the dry bulb temperature, for example in the smaller of the two passages and at the higher velocity, the velocity and action being controlled by regulation of the fan or damper, either under manual control by observation of a thermometer or by automatic control by a thermostat. Similarly, the circulation in the second of the cooled passages may be controlled to restrain or lower the humidity, this preferably being done in the larger of the two passages and at the lower relative velocity; the control being by fan or damper, and either manually under observation of wet and dry bulb thermometers or the like, or automatically by suitable known wet bulb and dry bulb controllers, or by a hygrostat or humidostat.

A particular cooperation is afforded by the employment of separate passages, with different velocities, for the temperature control and for the humidity control respectively. Experiments have shown that the factor of velocity is of considerable importance as effecting the desired results. Thus for bringing down the dry bulb temperature it is found that a relatively high velocity is preferable, such for example as 1500 feet per minute, affording ample cooling effect without substantial moisture reduction; whereas on the contrary, for the purpose of dehumidifying, to reduce dumidity, a relatively slow flow is found desirable, such as 300 feet per minute, in a relatively large duct, this affording the conditions and time for effective condensation of vapor.

Cooperating with these controls is the auxiliary one of progressively supplying outside air, filtered and cooled during its injection, but supplied in a relatively minor proportion to maintain progressively the desired composition of the room air. While the injected outside air might be passed through and cooled in a recirculation passage, as one of those mentioned, it is preferable to provide a separate passage therefor, submerged however to be cooled by the same means that cools the other passages; a relatively quite small passage or duct, as already described, sufficing for this purpose. The intaken outside air may be regulated in quantity or rate by its described fan or damper. The adjustment may be in accordance with the air pollution by $CO_2$, smoke, etc. The variation of fresh air injection may be under manual control and observation or through an automatic device such as a $CO_2$ meter, a photo-electric cell, or the like. Instead of traversing a submerged duct, when the outside air is comfortable, the filtered injected air may be bypassed directly into the room.

The method hereof may be elaborated by taking specific cases. Let us suppose that the weather is such that the room air is both hot and humid, for example at 95° dry bulb and 80° wet bulb temperatures, with a dew point of about 75°, and relative humidity of about 51%, the discomfort being high. Both controls will then be in effect, and accentuated actions will occur until conditions have been corrected both as to dry and wet bulb temperatures and as to dew point. For example, in the two-passage embodiment both fans will come into operation, for increased velocity of recirculation in the respective passages, thus cooperatively reducing dry and wet bulb temperatures. This may be continued until the desired comfort zone has been attained. During these actions a relatively large amount of water has been condensed in both passages and removed, thus preventing rise of humidity, and actually reducing the dew point.

Taking another case, with an initial moderate dry bulb temperature of about 80° and wet bulb temperature of about 75° and a dew point of about 73°, and relative humidity of about 79%, the main objective now is to reduce substantially the wet bulb temperature. Recirculation will now be caused only in the large duct, by its fan, and with such velocity as to reduce progressively the wet bulb temperature, slow enough however to afford a total substantial drop in the wet bulb temperature and thus bring about and maintain the room air in a desired comfort zone.

Taking a third case, with a high dry bulb temperature of about 95° and wet bulb temperature of about 75° and a dew point of about 67°, and relative humidity of about 38%, the main objective now is to reduce substantially the dry bulb temperature. Recirculation will now be caused only in the small duct and at a high velocity causing a substantial drop in the dry bulb temperature such as to bring about and maintain the room conditions within the desired comfort zone.

In either the second or third of the above two cases, it will be understood, both temperatures will be affected, the net result being however that the resulting comfort is brought about as and when desired. In all of the three described cases filtered outside air will be forced into the room through a very small duct thus maintaining a slight pressure in the room. Chemicals may be introduced in one or all three ducts or passages to absorb fumes, poisonous gases, vapors or extremely high humidity.

Taking a fourth case, with the outside air of such dry and wet bulb temperature that it can be introduced into said room without cooling or dehumidification, being already in the comfort zone, but containing dirt, dust, fumes, etc., or where there is undue outside noise, the injected filtered air may be bypassed directly in the room, as described.

Taking a fifth case, where there is sufficient wind velocity or relative velocity caused by motion (moving car, auto, trailer or boat) available near the outside air intake, then filtered outside air may be thereby forced into room or enclosure without running fan or blower. Outside baffles, vanes or movable ventilation may be installed leading to the outside air intake.

Referring now again to the term "humidity" and to the first three specific cases taken, and assuming that the desired comfort zone for the room or enclosure has a top corner located on a psychrometric chart at about 75° D. B. and 66° W. B., this spot indicates an absolute humidity of about 79 grains of moisture per pound of air and a relative humidity of 60%.

For Case one, the outside air is 95° D. B. 80° W. B. indicating absolute humidity of about 131 grains of moisture per pound of air and relative humidity of about 51%. Case two, the outside air is 80° D. B. 75° W. B., with absolute humidity of about 124 grains of moisture per pound of air, and relative humidity about 79%. Case three, the outside air is 95° D. B. 75° W. B., with absolute humidity of about 99 grains of moisture per pound of air, and relative humidity about 38%.

In Case one, in reaching desired comfort zone, the absolute humidity has been reduced by 52 grains (from 131 to 79) of moisture per pound of air, in Case two, by 45 grains, (from 124 to 79) and in Case three by 20 grains (from 99 to 79).

In Case one the relative humidity has been raised from 51 to 60% and in Case two it has been reduced, from 79 to 60% and in Case three it has been raised from 38 to 60%; therefore, to avoid confusion and misunderstanding, the term humidity has been used to designate absolute humidity except where otherwise specified.

In general the preferred control is based on the wet bulb and dry bulb temperatures, as described, which is sufficient to govern the combined conditions of temperature and humidity, and restore them to the comfort zone, by changes of air velocity in one or the other or both of the ducts. The relative humidity alone is not a reliable factor for velocity control, since it may vary either with or contrary to the temperatures or absolute humidity or comfort.

In the specific aspect that the invention embodies two separate and independent passages, each for example like that shown in Figs. 3 to 6 but the two placed in separate trunks or cabinets, and one having a large duct and low velocity and the other a small duct and high velocity, the method of control and operation thereof will be similar to that heretofore described in connection with the two recirculation passage apparatus of Figs. 1 and 2. In such an embodiment, and as well in the first and second cases previously discussed, the velocity in the larger of the ducts, in the preferred operation, will be increased upon rise in wet bulb temperature and vice versa.

In the specific aspect that the invention in one embodiment uses only one recirculation passage, as in Figs. 3 to 6, the method of control or operation will be accomplished by varying the velocity therein of the recirculation air in accordance with either the dry bulb or the wet bulb temperature, or with the difference or other relation between these.

I claim:

1. In apparatus for air-conditioning an enclosed space or room the combination of a tank for holding a body of heat-transferring liquid as water at a different temperature than the air in the space, an air recirculation passage from and to the space comprising an air duct portion of substantial section submerged in the liquid space in the tank, with air downtake to and uptake from said submerged duct portion, whereby the passage is effectively U-shaped, and an air forcing device or fan arranged for maintaining circulation through said passage; and a separate submerged duct for outside air, with an outside connection thereto, and a fan to indraw outside air and force it through said connection and separate duct into the space.

2. Apparatus as in claim 1 and wherein is a means to regulate the intake of outside air.

3. Apparatus as in claim 1 and wherein is a regulable bypass adapted to deliver the intake of outside air direct to the space without traversing said submerged outside air duct.

4. Method of dehumidifying, cooling and improving the air in a room or similar enclosure, comprising recirculating such air into and through two separate walled air passages, the direction of the air being down thence across and thence up as it flows through said passages and thence back to the enclosure, while maintaining in direct contact with said air passage walls a body of water, and subjecting such water to a refrigerating action of sufficient intensity to freeze partly or wholly the water into ice, whereby the temperature of the circulating air is reduced in each of said walled passages and wherein the enclosure air is refreshed by outside filtered air forced into enclosure and creating excess inside pressure; and increasing the velocity of the circulating air in one air passage when the wet bulb temperature in said enclosure rises above a predetermined point, and increasing the velocity of the circulating air in the other air passage when the dry bulb temperature in said enclosure rises above a predetermined point and increasing the velocity of the outside air admission as the pollution of the enclosure rises.

5. The method of air-conditioning in the warm season an enclosed space or room to restrain the dry and wet bulb temperatures and humidity thereof against rising excessively above a desired comfort zone, comprising recirculating the room air through two separate air passages while cooling the flowing air streams for reduction of dry and wet bulb temperatures and humidity thereof, controlling such cooling action and the results thereof in one passage by varying the velocity of the recirculation air flow in said passage according to the dry bulb temperature in the enclosure, and controlling such cooling action and results in the other passage by velocity variation according to the wet bulb temperature in the enclosure.

6. The method of air-conditioning in the warm season an enclosed space or room to restrain the dry and wet bulb temperatures and humidity thereof against rising excessively above a desired comfort zone, comprising recirculating the room air through two separate air passages of different size while cooling the flowing air streams for reduction of temperatures and dehumidification thereof, controlling such cooling action in the larger passage by increasing the velocity of the recirculation air flow when the wet bulb temperature in the enclosure rises excessively and vice versa, and controlling such cooling action in the smaller passage by increasing the velocity of the air recirculation when the dry bulb temperature in the enclosure rises excessively and vice versa.

7. In apparatus for air-conditioning an enclosed space or room the combination of a tank for holding a body of heat-transferring liquid as water at a cooler temperature than the air in the space, a first air recirculation passage from and to the space comprising a longitudinal air duct portion of substantial section submerged in the liquid space in the tank, with air intake and outtake portions to and from said longitudinal duct portion, and a separate second such recirculation passage with submerged air duct, and separate air circulation control means for maintaining predetermined differential air circulation velocities through said two passages respectively.

8. Apparatus as in claim 7 and wherein one submerged duct is relatively small and the other relatively large in sectional area; whereby the latter may be caused to conduct air at relatively low velocity thereby promoting substantial condensation therefrom, with consequent substantial reduction of the dew point of the air stream delivered therefrom.

9. Apparatus as in claim 7 and wherein one submerged duct is of substantially larger sectional area than the other; and wherein the air control means include separate blowers and regulation means for the respective ducts.

10. Apparatus as in claim 7 and wherein one submerged duct is of substantially larger sectional area than the other; and wherein the air control means include separate dampers for regulation of the flow through the respective ducts.

11. Apparatus as in claim 7 and wherein the low part of one duct is higher than the low part of the other duct, and there is a drain passage from the former to the latter duct for discharge of condensate, and a drain passage from the latter to waste.

12. Method of dehumidifying and cooling the air in a room or similar enclosure comprising circulating such air into and through two separate walled passages and back to enclosure, while maintaining in direct contact with said air passage walls a body of water, and subjecting such water to a refrigerating action of sufficient intensity to freeze partly or wholly the water into ice, and increasing the velocity of the circulating air in the first air passage when the wet bulb temperature in said enclosure rises above a first predetermined temperature, and increasing the velocity of the circulating air in the second air passage when the dry bulb temperature in said enclosure rises above a second predetermined temperautre which is higher than the first mentioned predetermined temperature.

13. The method of claim 12 and wherein through a third walled passage a supply of outside air is forced into the enclosure at a rate of flow variable according to the content of pollution of the enclosure air.

14. The method of claim 5 and wherein through a third walled passage a supply of outside air is forced into the enclosure at a rate of flow variable according to the content of pollution of the enclosure air.

CHARLES B. GRADY.